(12) United States Patent
Coronel et al.

(10) Patent No.: US 8,631,505 B1
(45) Date of Patent: Jan. 14, 2014

(54) METHOD, SYSTEM, AND DEVICE FOR PROVIDING A MARKET FOR DIGITAL GOODS

(71) Applicants: Jack Bertram Coronel, Las Vegas, NV (US); Joseph R Coronel, Las Vegas, NV (US)

(72) Inventors: Jack Bertram Coronel, Las Vegas, NV (US); Joseph R Coronel, Las Vegas, NV (US)

(73) Assignee: JRC Holdings, LLC, Las Vegas, NV (US)

( * ) Notice: Subject to any disclaimer, the term of this patent is extended or adjusted under 35 U.S.C. 154(b) by 0 days.

(21) Appl. No.: 13/844,971

(22) Filed: Mar. 16, 2013

(51) Int. Cl.
*H04L 29/06* (2006.01)
*G06F 21/10* (2013.01)
*G06Q 30/06* (2012.01)
*G06Q 20/12* (2012.01)

(52) U.S. Cl.
CPC ............ *G06F 21/10* (2013.01); *G06Q 30/0613* (2013.01); *G06Q 20/1235* (2013.01); *H04L 2209/603* (2013.01); *G06Q 30/0645* (2013.01)
USPC .......................................................... 726/28

(58) Field of Classification Search
CPC ............... G06F 21/10; G06Q 20/1235; G06Q 30/0613; G06Q 30/0645; H04L 2209/603
USPC .......................................................... 726/28
See application file for complete search history.

(56) References Cited

U.S. PATENT DOCUMENTS

| | | |
|---|---|---|
| 5,598,470 A | 1/1997 | Cooper et al. |
| 5,757,908 A | 5/1998 | Cooper et al. |
| 7,024,393 B1 | 4/2006 | Peinado et al. |
| 7,228,437 B2 | 6/2007 | Spagna et al. |
| 7,249,107 B2 | 7/2007 | Yaacovi |
| 7,346,580 B2 | 3/2008 | Lisanke et al. |
| 7,383,228 B2 | 6/2008 | Lisanke et al. |
| 7,415,439 B2 | 8/2008 | Kontio et al. |
| 7,421,411 B2 | 9/2008 | Kontio et al. |
| 7,441,037 B2 | 10/2008 | Saxena |
| 7,444,413 B2 | 10/2008 | Saxena |
| 7,594,275 B2 | 9/2009 | Gu et al. |

(Continued)

FOREIGN PATENT DOCUMENTS

WO    WO 2013/103568 A1    7/2013

OTHER PUBLICATIONS

Digital Entertainment Content Ecosystem (DECE) LLC, Ultraviolet Help & FAQs found at http://www.uvvu.com/faqs.php, first published online Dec. 15, 2011 in the US.

(Continued)

*Primary Examiner* — Michael S McNally
(74) *Attorney, Agent, or Firm* — Robert Ryan Morishita; Morishita Law Firm, LLC

(57) ABSTRACT

A system includes one or more processors and computer-readable storage media storing instructions executable by a processor to storing a digital good in a cloud data store that is accessible by a user devices associated with a first user and a second user through their respective accounts. When a request to transfer the access rights to the digital good from the account of the first user to the account of a second user, the transfer of the access rights to the digital good is authorized based on satisfaction of one or more business rules and the access rights are transferred from the account of the first user to the account of the second user while said digital good remains in said cloud data store. The access rights are deleted from the account of the first user.

4 Claims, 3 Drawing Sheets

(56) References Cited

U.S. PATENT DOCUMENTS

| | | | |
|---|---|---|---|
| 7,769,641 B2 * | 8/2010 | Jouret et al. | 705/26.1 |
| 7,818,811 B2 * | 10/2010 | Kirovski et al. | 726/26 |
| 7,962,413 B2 | 6/2011 | Lisanke et al. | |
| 7,978,848 B2 | 7/2011 | Zhu et al. | |
| 8,117,274 B2 | 2/2012 | Schilders | |
| 8,325,920 B2 | 12/2012 | Rassool et al. | |
| 8,359,246 B2 | 1/2013 | Buchheit | |
| 8,364,548 B2 | 1/2013 | Jouret et al. | |
| 8,364,595 B1 * | 1/2013 | Ringewald | 705/51 |
| 8,429,752 B2 | 4/2013 | Nimon et al. | |
| 8,463,658 B2 | 6/2013 | Racco | |
| 2003/0200313 A1 | 10/2003 | Peterka et al. | |
| 2004/0024886 A1 * | 2/2004 | Saxena | 709/229 |
| 2004/0034601 A1 | 2/2004 | Kreuzer | |
| 2004/0117490 A1 | 6/2004 | Peterka et al. | |
| 2004/0267388 A1 | 12/2004 | Perdon | |
| 2005/0187879 A1 | 8/2005 | Barrett et al. | |
| 2006/0100965 A1 * | 5/2006 | Simelius | 705/59 |
| 2007/0005503 A1 * | 1/2007 | Engstrom et al. | 705/59 |
| 2007/0055631 A1 * | 3/2007 | Li | 705/57 |
| 2007/0106805 A1 | 5/2007 | Marples et al. | |
| 2007/0112678 A1 * | 5/2007 | Himelfarb | 705/51 |
| 2007/0204011 A1 | 8/2007 | Shaver et al. | |
| 2008/0047006 A1 * | 2/2008 | Jeong et al. | 726/21 |
| 2009/0012805 A1 * | 1/2009 | Schnell et al. | 705/1 |
| 2009/0165101 A1 * | 6/2009 | Peterka et al. | 726/6 |
| 2009/0193526 A1 | 7/2009 | Sweazey | |
| 2011/0016182 A1 * | 1/2011 | Harris | 709/206 |
| 2011/0106917 A1 | 5/2011 | Park et al. | |
| 2011/0231273 A1 * | 9/2011 | Buchheit | 705/26.1 |
| 2011/0302009 A1 * | 12/2011 | Freed et al. | 705/14.16 |
| 2011/0314560 A1 * | 12/2011 | Harris | 726/28 |
| 2012/0173625 A1 | 7/2012 | Berger | |
| 2013/0060615 A1 | 3/2013 | Block et al. | |
| 2013/0060616 A1 | 3/2013 | Block et al. | |
| 2013/0060700 A1 | 3/2013 | Rassool et al. | |
| 2013/0173912 A1 * | 7/2013 | Cui et al. | 713/156 |

OTHER PUBLICATIONS

Jim Taylor, Ultraviolet Demystified Ultraviolet Frequently Asked Questions (and Answers) found at http://www.uvdemystified.com/uvfaq.html, first published online Apr. 16, 2011 in the US.

* cited by examiner

METHOD, SYSTEM, AND DEVICE FOR PROVIDING A MARKET FOR DIGITAL GOODS

FIELD OF THE INVENTION

The present invention relates to systems, devices, and methods for providing access to digital goods. More specifically, the present invention includes systems, devices, and methods for transferring access rights to digital goods without duplicating or transferring the digital good

BACKGROUND OF THE INVENTION

Digital goods, also referred to as digital content, includes images, electronic books "e-books," audio recordings, video recordings, computer applications, and other forms of information transferable over a communication network such as the internet.

As described in U.S. Pat. No. 8,364,595, the disclosure of which is incorporated herein by this reference, transfers of digital goods between users, as well as content providers and users, may take many different forms including a sale, a rental, a gift, a loan, a trade, etc. The problem identified in U.S. Pat. No. 8,364,595 is that copies of digital goods are easy and inexpensive to make, which can lead to repeated transferring of a digital good without the right to use the digital good. That is, users copy and distribute digital goods without the legal right to copy and distribute and, just as importantly, the recipients of the copies lack the legal right to use the copies.

As stated in U.S. Pat. No. 8,364,595, a secondary market in digital goods is economically efficient since users may own legitimate copies and transfer that legitimate copy to another user without running afoul of copyright law. The solution presented in U.S. Pat. No. 8,364,595 is to create an electronic marketplace that acts as the "middleman" in any transfer of a digital good. In essence, U.S. Pat. No. 8,364,595 discloses creating a personalized data store or digital locker for each user. Upon receiving a request to transfer a digital good from one user to another, the marketplace transfers the digital good from the transferor's digital store to the transferee's digital store and deleting the digital good from the transferor's digital store.

SUMMARY OF THE INVENTION

The present invention includes a system and computer-readable medium for carrying out a process. In one optional embodiment, a system includes one or more processors and computer-readable storage media encoded with instructions that, when executed on the one or more processors, instruct the one or more processors to perform acts for enabling permissible transfer of access rights to digital goods among different users.

A digital good is obtained from an authorized source and stored in a cloud data store. The cloud data store is accessible by a user device associated with a first user through an account of a first user, a second user through an account of a second user, and so forth. The digital good is a digital good in which the first user has legitimately obtained access rights.

A processor determines that the access rights to the digital good are available for transfer from the account of the first user and an indication is provided that the access rights to the digital good are available for transfer from the account of the first user.

A request to transfer the access rights to the digital good to the account of a second user is received. In response to the request, the transfer of the access rights to the digital good to the account of the second user is authorized based on satisfaction of one or more business rules. Upon authorization of the request to transfer the access rights to the digital good to the account of the second user, the access rights to the digital good are transferred from the account of the first user to the account of the second user while the digital good remains in the cloud data store. The access rights to the digital good are deleted from the account of the first user.

DESCRIPTION

Figure 1:
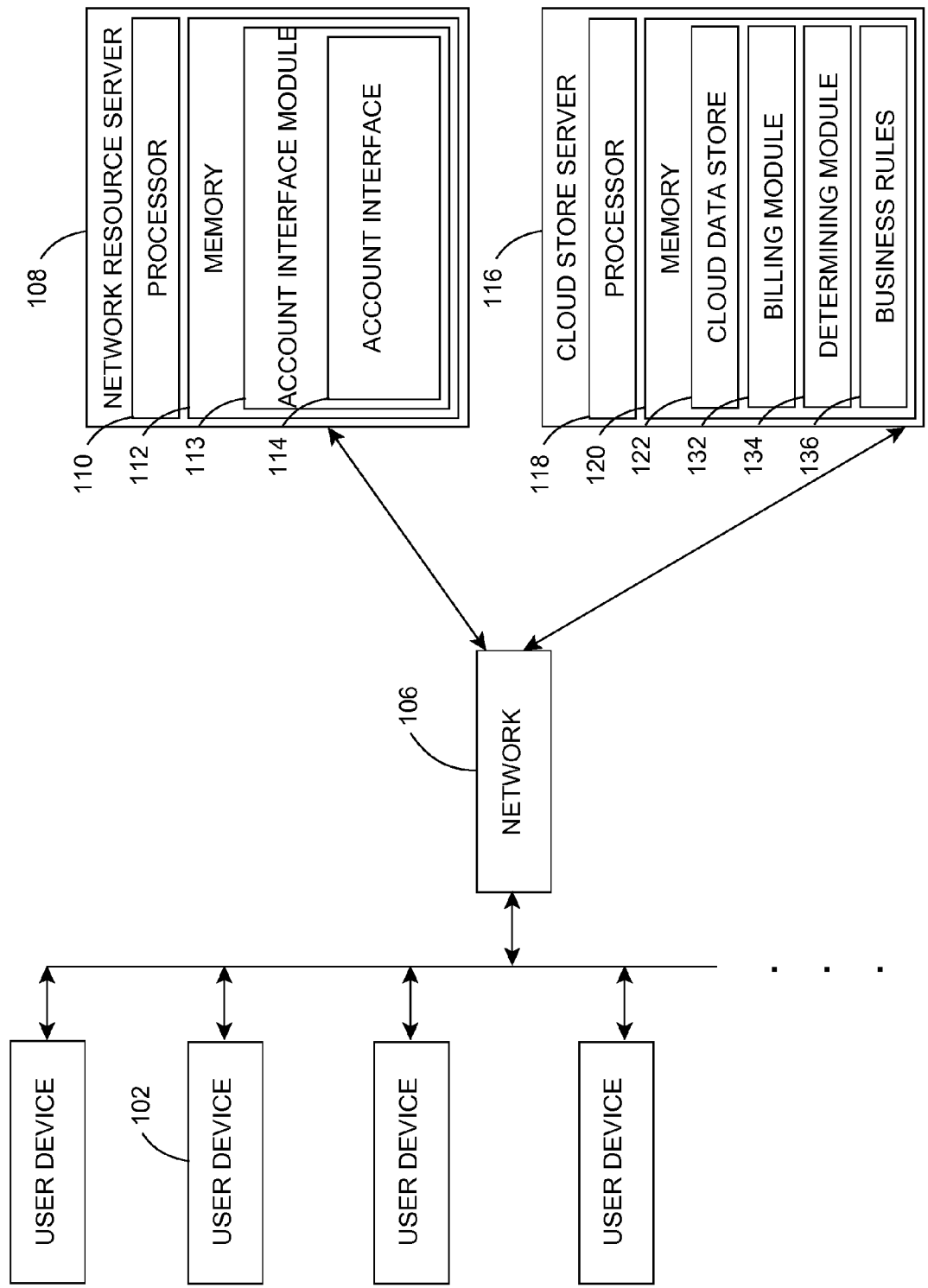
FIG. 1 is a block diagram of a system according to an embodiment of the present invention.
Figure 2:
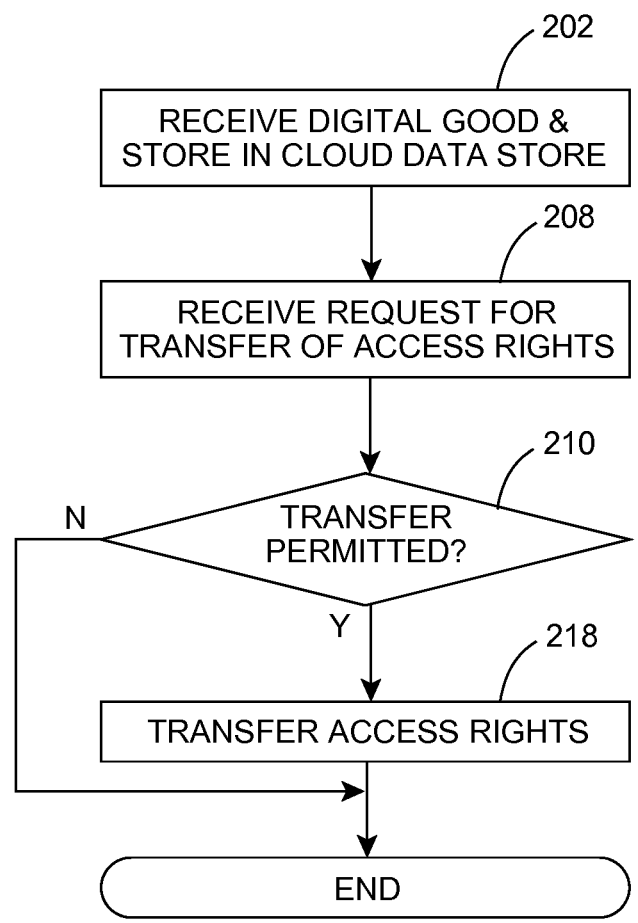
FIG. 2 is a flowchart of a method according to an embodiment of the present invention.

Reference is now made to the figures wherein like parts are referred to by like numerals throughout. As described above, digital goods may include images, e-books, audio recordings, video recordings, computer applications, and any other forms of information transferable over a communication network such as the Internet. A digital good is one which a user has legitimately obtained access rights to, and may permissibly transfer to another user. To avoid issues that arise from creating copies which may interfere with a content producer's rights, it is desirable to facilitate transfer of the rights associated with digital goods from the content producer (primary marketplace) or original user (secondary marketplace) to a subsequent user of a digital good while avoiding problems with respect to copyright infringement, the first sale doctrine, license obligations, and the like. Thus, a primary or secondary market which allows users and content owners to effectively and permissibly transfer access rights to digital goods to others without transferring the digital good or a copy of the digital good is therefore desired. As used herein, it is understood that the digital good is one to which a user or content owner possesses transferable "access rights."

This disclosure describes an electronic marketplace facilitating a primary or secondary market for access rights to digital goods. The electronic marketplace acts as to both provide information regarding the availability of access rights in digital goods as well as transfer access rights in the digital goods. Digital goods are stored in a cloud data store which may be implemented as a non-resident, user-generic storage location of digital goods accessible by one or more devices at one or more locations through one or more networks. Accordingly, the cloud data store may be maintained in storage remote from the devices that access the cloud data store, e.g., a remote database, a network based storage resource such as a cloud storage service, or the like. The cloud data store is common, i.e., shared, among users in that each user may access the cloud data store and the digital goods stored within it, although, as described below, an account may be required to access the cloud data store, i.e., the cloud data store may be publicly accessible, but with conditions and restrictions, such as the requirement of a user account. As described herein, permissible transfer of the access rights associated with a digital good is made in accordance with policies enforced in the marketplace, and may include digital good licensing conditions, legal requirements of the country or jurisdiction to which the marketplace is subject, and so forth.

In various different implementations, digital goods accessible from the cloud data store may be streamed to a user's local computing device or otherwise accessed by a user through a cloud data store interface via one or more devices at one or more locations via one or more networks. As understood in the art, "stream" and "streaming" refer to transfer of a digital good from one storage location or computing device to another storage location or computing device, without storing the digital good at the receiving storage location or computing device after conclusion of the streaming. Streaming can occur in a more or less continuous stream or the stream may be segmented, thereby ensuring that the receiving computing device or storage location does not receive a file that contains the complete stream. In any case, streaming is transitory in nature insofar as the digital good (or a portion thereof) is present in memory of the receiving storage location or computing device only temporarily during the act of streaming.

In one example, a user may use an account interface to access and manage his or her access rights to digital goods in a cloud data store. Because the user does not possess a copy of the digital good in a personal data store, the user is only able to transfer access rights to digital goods from the user's account to the account of another user. An account interface may also allow a user to maintain within his or her account a list of desired access rights (for example, movies the user would like to have access to from the cloud data store), maintain a list of access rights which are available for transfer (for example, movies the user no longer wants to be able to access), or the like. The transfer of the available access rights from a first user's account to a second user's account may be a result of a sale, rental, loan, gift, trade, or the like.

As illustrated in FIG. 1, a system according to an embodiment of the present invention includes user devices 104 to access a network 106 and establish communication with a server 108 implementing a network resource, e.g., a website. It is contemplated that any quantity of user devices 104 may be provided.

A network 106 allows communication between user devices 104 and servers, such as a network resource server 108. A network 106 may be any type of communication network, including the Internet, a local area network ("LAN"), a wide area network ("WAN"), a wireless wide area network, a cable television network, a wireless network, a telephone network, or the like.

User devices 104 may take any form, including a personal computer, entertainment system, PDA, mobile phone, tablet device, e-reader, kiosk, game console, or other computing device that is configured to communicate over a network. A network resource server 108 may be either a single server or a larger collection of servers, such as a data center or multiple data centers. Network resource server 108 may include one or more processors 110 and a memory 112. The memory 112 may take any form of computer-readable storage media including, but not limited to, optical data storage, magnetic data storage, random access memory, read-only memory, electrically erasable programmable read-only memory (EEPROM), flash memory or other solid-state memory, or any other medium which can be used to store information which is accessible to a processor 110. The processor 110 is configured to execute instructions stored in the memory 112.

For example, an account interface module 113 may be stored in memory 112 and executed by the processor 110 to provide an account interface 114 to a user. The account interface 114 provides access functionality to users of an account accessible through the network resource server 108 via a network 106. The cloud data store server 116 may be located on the same or a separate server as the network resource server 108 and may also include either a single server, or a larger collection of servers, such as a data center or multiple data centers. A cloud data store server 116 may include one or more processors 118 and a memory 120, the memory including one or more computer-readable storage media. A processor 118 is configured to execute instructions stored in the memory 120.

In one embodiment, stored within memory 120 is a cloud data store 122 associated with a plurality of user accounts. As shown in the illustrated example, a single cloud data store 122 stores a plurality of digital goods 124. The digital goods are, in an optional embodiment, not stored in the cloud data store 122 by users. Rather, digital goods are stored in the cloud data store 122 by content providers. It is contemplated that multiple users may hold the same access rights from an owner for the same digital good (for example, many people may have rights to view any particular movie), but only a single copy (or a limited number of copies) of the digital good is/are stored in the cloud data store 122 with shared access among all users possessing access rights to the digital good. While the cloud data store 122 is illustrated as a single memory 120, it is contemplated that the cloud data store 122 may be distributed across multiple separate memories residing on the same or different servers or in remote data storage accessible to the cloud data store server.

A user may stream, download, or otherwise access a digital good stored in the cloud data store for which the user has access rights. Access rights to digital goods may also be relinquished, added, terminated, transferred, or moved from one account to another account for a variety of reasons and when permitted. For example, a user may permissibly move access rights to digital good from his or her account to the account of another user of an electronic marketplace. By "move," the present invention contemplates that an actual physical transfer of data may occur or an effective transfer may occur with the creation of access rights in the transferee's account that are substantially equivalent to the access rights in the transferor's account. In the illustrated example, access rights to a digital good may be permissibly moved 130 from a first user's account to a second user's account. Once permissibly moved, the access rights to the digital good may be deleted from the first user's account so that the access rights to the digital good no longer reside in the first user's account and now reside only in the second user's account. Significantly, the digital good is untouched in the cloud data store throughout the move.

In some embodiments, a billing module 132 may be configured to levy a fee upon transfer (e.g., movement, download, and/or streaming) of a digital good. A determining module 134 may be configured to determine whether to permit or deny transfer of the used digital good according to one or more business rules 136.

According to an aspect of the present invention, a method for permissibly moving a used digital good to another cloud data store includes receiving 202 a digital good from an authorized source and storing the digital good in a cloud data store. Again, the authorized source may be a content provider (such as a publisher, movie studio, music studio, software producer, game producer, or the like), content distributor (such as a bookseller, movie distributor, music distributor, software distributor, game distributor, or the like), another user with legitimately obtained rights to transfer, a merchant, or another trusted source permitted to distribute access rights to digital goods and/or digital goods themselves to users.

A request for transfer of access rights to a digital good from one user account to another user account is received 208. The network resource server 108, cloud data store server 116, or another server or device acting as a proxy for the cloud data store server 116 may receive the request. Based on various business rules, which may vary from embodiment to embodiment, a determination 210 may be made whether the transfer is permitted. If the transfer is permitted, the access rights are transferred 218 from the originator's account to the recipient's account.

When compensation for a permissible transfer takes place, such as when an originator is selling his or her access rights to a recipient, a credit may be made to an originator account while a corresponding debit (possibly less a transfer fee described next) may be made to the recipient's credit card or other payment account. Similarly, an entity may levy a fee for the transfer instead of, or in addition to, the compensation to the transferor of access rights. The fee may be levied from the transferor, transferee, both, or a third party, such as a content distributor who may choose to pay the transfer fee of digital goods to encourage distribution of digital goods. The entity levying the fee may be the operator of the cloud data store server, owner of the digital good receiving a royalty, or the like.

Figure 3:
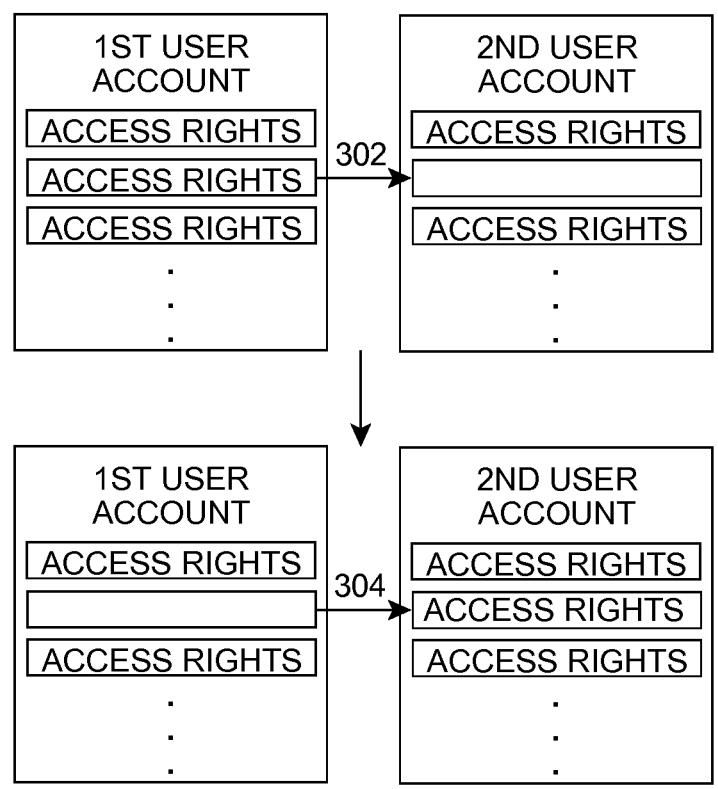
FIG. 3 is a block diagram of a system according to an embodiment of the present invention.

Referring to FIG. 3, access rights to a digital good begin in the account associated with a first user. The first user agrees to make a permissible sale. The operator of the marketplace moves 302 access rights to the digital good to a second user. In the course of the move, access rights to the digital good are removed 304 from the first user's account and access rights which are identical or substantially equivalent to the first user's access rights appear (e.g., are copied, transferred, duplicated, or otherwise written to) the second user's account. The digital good itself remains untouched in the shared cloud data store 122. As a result, the first user is restricted from accessing the digital good at the cloud data store 122 and the second user is allowed to access the digital good at the cloud data store 122. As may be appreciated, the second user may likewise transfer his or her access rights to yet a third user in like fashion.

It is contemplated that digital transfers need not be limited to gifts, sales, or other "permanent" transfers. For example, temporary transfers of access rights, such as loans of digital goods, may be permitted. A loan of access rights may be of indefinite duration, have an expiration date, or some other triggering event which terminates the loan. For example, a library may loan access rights to a digital book to a library patron for a fixed period of time, while a user may loan access rights to a digital book to a friend indefinitely. When a loan expires, access rights to the loaned digital good are removed from the borrower's account, while the digital good remains untouched in the cloud data store. Access rights to the digital good may be restored to the account of the lender, forwarded to another borrower, or terminated. In this regard, it is noted that while it may be desirable to limit the copies of a digital good and therefore limit or prohibit transfers of an actual digital good, the present invention contemplates that the digital good is not copied with each transfer and that access rights to the digital good may be transferred without limit in both a primary market and a secondary market.

While certain embodiments of the present invention have been shown and described it is to be understood that the present invention is subject to many modifications and changes without departing from the spirit and scope of the claims presented herein.

We claim:

1. A system comprising:
one or more processors; and
computer-readable storage media encoded with instructions that, when executed on the one or more processors, instruct the one or more processors to perform acts for enabling permissible transfer of access rights to digital goods among different users, the acts comprising:
storing a digital good obtained from an authorized source in a cloud data store, wherein a digital good in the cloud data store is accessible by a user device associated with a first user through an account of a first user wherein the access rights stored in the account of the first user at a network resource server accessible by said user device determine the first user's access to the digital good, and wherein the digital good is a digital good in which the first user has legitimately obtained access rights;
determining that the access rights to the digital good are available for transfer from the account of the first user;
providing an indication that the access rights to the digital good are available for transfer from the account of the first user;
receiving a request to transfer the access rights to the digital good to the account of a second user, wherein the digital good in the cloud data store is accessible by a user device associated with the second user through said account of said second user wherein the access rights stored in the account of the second user at a network resource server accessible by said user device determine the second user's access to the digital good;
authorizing transfer of the access rights to the digital good to the account of the second user based on satisfaction of one or more business rules;
upon authorization of the request to transfer the access rights to the digital good to the account of the second user, exclusively transferring the access rights to the digital good from the account of the first user to the account of the second user while said digital good remains in said cloud data store without transferring the digital good; and
deleting the access rights to the digital good from the account of the first user, thereby excluding the account associated with the first user from accessing the digital good.

2. A non-transient, tangible computer-readable storage media encoded with instructions that, when executed on a processor, instruct the processor to perform acts with respect to a digital good associated with access rights, wherein the digital good is stored in a cloud data store separate from the non-transient computer-readable storage media, comprising:
determining that the access rights to the digital good are available for transfer from an account of a first user wherein the access rights stored in the account of the first user at a network resource server accessible by said user device determine the first user's access to the digital good;
providing an indication that the access rights to the digital good are available for transfer from the account of the first user;
receiving a request to transfer the access rights to the digital good to an account of a second user, wherein the digital good in the cloud data store is accessible by a user device associated with the second user through said account of said second user wherein the access rights stored in the account of the second user at a network resource server accessible by said user device determine the second user's access to the digital good;

authorizing transfer of the access rights to the digital good to the account of the second user based on satisfaction of one or more business rules;

upon authorization of the request to transfer the access rights to the digital good to the account of the second user, exclusively transferring the access rights to the digital good from the account of the first user to the account of the second user while said digital good remains in said cloud data store without transferring the digital good; and deleting the access rights to the digital good from the account of the first user, thereby excluding the account associated with the first user from accessing the digital good.

3. A system comprising:

one or more processors; and computer-readable storage media encoded with instructions that, when executed on the one or more processors, instruct the one or more processors to perform acts for enabling permissible transfer of access rights to digital goods among different users, the acts comprising:

storing a digital good obtained from an authorized source in a cloud data store, wherein a digital good in the cloud data store is accessible by a user device associated with a first user through an account of a first user wherein the access rights stored in the account of the first user at a network resource server accessible by said user device determine the first user's access to the digital good, wherein the digital good is a digital good in which the first user has legitimately obtained access rights and the digital good is not stored in the account of the first user;

determining that the access rights to the digital good are available for transfer from the account of the first user;

providing an indication that the access rights to the digital good are available for transfer from the account of the first user;

receiving a request to transfer the access rights to the digital good to the account of a second user, wherein the digital good in the cloud data store is accessible by a user device associated with the second user through said account of said second user wherein the access rights stored in the account of the second user at a network resource server accessible by said user device determine the second user's access to the digital good;

authorizing transfer of the access rights to the digital good to the account of the second user based on satisfaction of one or more business rules;

upon authorization of the request to transfer the access rights to the digital good to the account of the second user, exclusively transferring the access rights to the digital good from the account of the first user to the account of the second user while said digital good remains in said cloud data store without transferring the digital good; and deleting the access rights to the digital good from the account of the first user, thereby excluding the account associated with the first user from accessing the digital good.

4. A non-transient, tangible computer-readable storage media encoded with instructions that, when executed on a processor, instruct the processor to perform acts with respect to a digital good associated with access rights, wherein the digital good is stored in a cloud data store separate from the non-transient computer-readable storage media, comprising:

determining that the access rights to the digital good are available for transfer from an account of a first user wherein the access rights stored in the account of the first user at a network resource server accessible by said user device determine the first user's access to the digital good and wherein the digital good is not stored in the account of the first user;

providing an indication that the access rights to the digital good are available for transfer from the account of the first user;

receiving a request to transfer the access rights to the digital good to an account of a second user, wherein the digital good in the cloud data store is accessible by a user device associated with the second user through said account of said second user wherein the access rights stored in the account of the second user at a network resource server accessible by said user device determine the second user's access to the digital good;

authorizing transfer of the access rights to the digital good to the account of the second user based on satisfaction of one or more business rules;

upon authorization of the request to transfer the access rights to the digital good to the account of the second user, exclusively transferring the access rights to the digital good from the account of the first user to the account of the second user while said digital good remains in said cloud data store without transferring the digital good; and deleting the access rights to the digital good from the account of the first user, thereby excluding the account associated with the first user from accessing the digital good.

* * * * *